J. M. SHEAR.
CLIP FOR CORNER BEADS OR STRIPS.
APPLICATION FILED JULY 13, 1908.
956,439.
Patented Apr. 26, 1910.
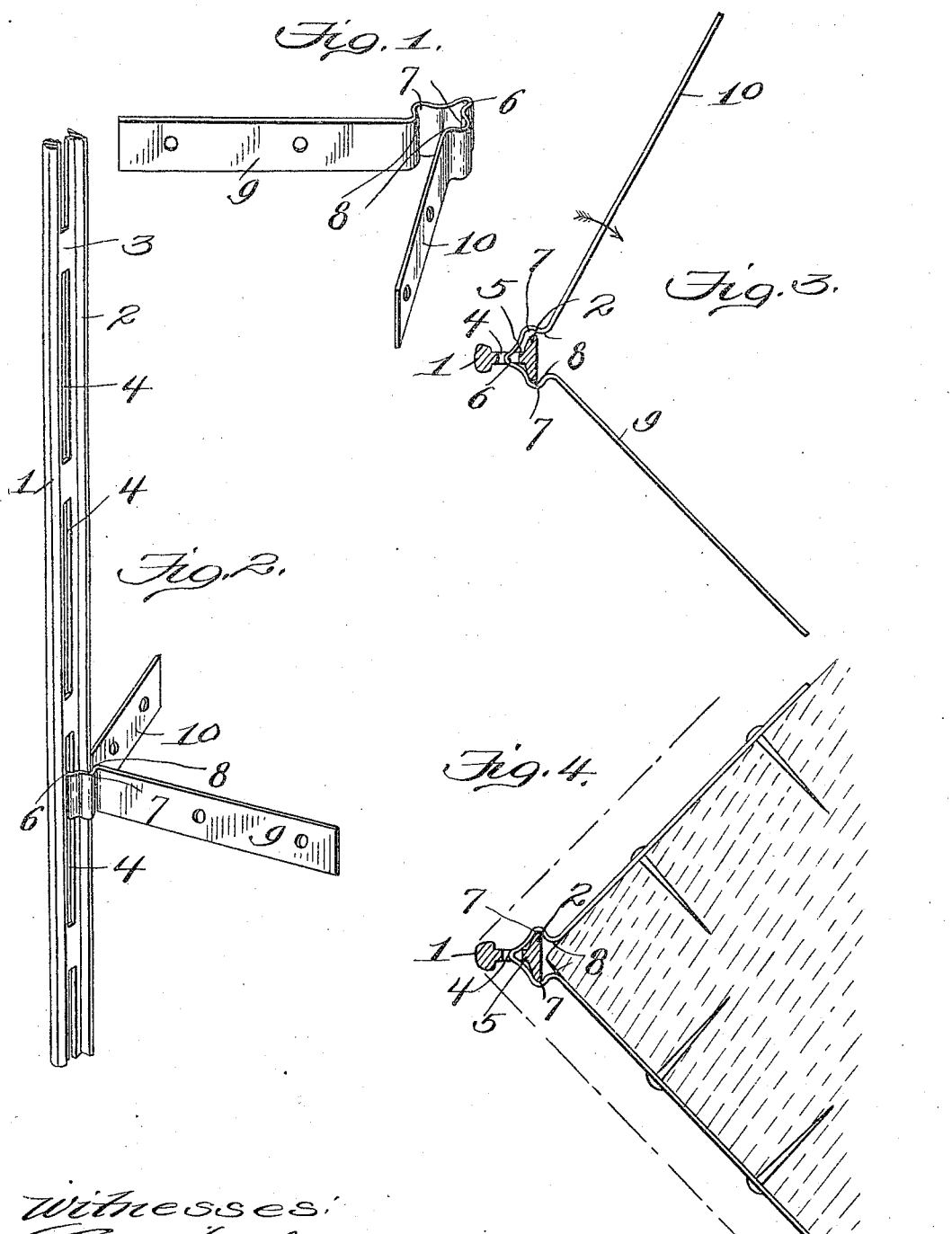
Witnesses:
Inventor
Joseph M. Shear
By James L. Norris
Atty.

UNITED STATES PATENT OFFICE.

JOSEPH M. SHEAR, OF WARREN, PENNSYLVANIA, ASSIGNOR TO ROGERS-SHEAR COMPANY, OF WARREN, PENNSYLVANIA, A CORPORATION OF PENNSYLVANIA.

CLIP FOR CORNER BEADS OR STRIPS.

956,439.     Specification of Letters Patent.     Patented Apr. 26, 1910.

Application filed July 13, 1908. Serial No. 443,296.

*To all whom it may concern:*

Be it known that I, JOSEPH M. SHEAR, citizen of the United States, residing at Warren, in the county of Warren and State of Pennsylvania, have invented new and useful Improvements in Clips for Corner Beads or Strips, of which the following is a specification.

My present invention relates to improvements in corner beads or strips of the character adapted to be applied to a corner or other exposed edge of a wall or similar structure for the purpose of protecting the plastering or other wall covering, and it has for its object primarily to provide a simple and improved clip for supporting or securing the bead or strip in position, the clip being so constructed that it may be formed of a single piece of material which is capable of being quickly and easily applied to the bead or strip by inexperienced persons, and when fastened, the clip obtaining a secure hold upon the bead or strip, thereby supporting the same rigidly and firmly in position, the clip being capable of resisting forces tending to deflect the bead or strip, which deflection if permitted to occur, would loosen or crack the plastering or other wall covering.

Another object of the invention is to provide an improved clip of this character which is so constructed as to automatically obtain a firm grip upon the bead or strip when the arms of the clip are adjusted to the angle of the corner, the present invention enabling a firm gripping action to be obtained by the clip without requiring the use of tools or other implements, and when the clip is used in connection with a corner bead having a relatively wide base flange, a rigid and firm support is secured which is capable of readily resisting any blows or other strains which may be brought to bear upon the protective bead or strip.

A further object of the invention is to provide an improved corner bead of solid rolled construction and of substantially T-form, this bead being adapted to receive the clip and having a supporting or base flange which is gripped by the clip, the bead by reason of its form possessing the maximum rigidity, and the clip coöperating therewith to provide a firm and solid support when the bead is in position.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a supporting clip constructed in accordance with my present invention; Fig. 2 is a perspective view showing a clip of the construction shown in Fig. 1 applied to a corner bead, preparatory to the application of the bead to the wall; Fig. 3 is a detail view showing the manner of snapping the clip in position upon the corner bead or strip; and Fig. 4 is a sectional view of the clip and bead secured to the corner, the dotted lines showing the surface of the plaster adjacent to the bead.

Similar parts are designated by the same reference characters in the several views.

Supporting clips constructed in accordance with my present invention are capable of being used in connection with corner beads or strips of various forms, the clip being shown in the present instance in connection with a corner bead of approximately T-form or a form approaching that of the ordinary railroad rail. This bead in the present instance is provided with the usual ball or head 1 and a base or supporting flange 2, the usual web 3 connecting the head and flange, and the base flange projecting laterally at opposite sides of the web. The dimensions of the bead may be varied according to the desired thickness of the plaster at the corner or exposed edge of the wall to which the same is to be applied, or the proportions may be varied in order that the best results may be obtained in each particular case. In order to lessen the weight of the bead, to provide plaster-keying means thereon, and to enable the bead to accommodate the supporting clips, a series of longitudinally spaced slots or apertures 4 are formed in the web portion of the bead, these apertures being preferably of such a size as to extend not quite to the outer surface of the base flange portion thereof, thereby leaving a longitudinally extending rib 5 which will perform a function to be hereinafter described. In applying the bead to the corner of a wall or other structure, it is usual to employ a suitable number of clips, the number employed being determined according to the length of the bead or strip or the desired rigidity, and by elongating the apertures 4 in a direction longitudinally of the bead, it is possible to place the supporting clips at practically any desired point upon the bead or strip.

In applying supporting clips to the bead or protecting strip, one end of each clip is passed through an appropriate aperture 4 formed in the web of the bead, and each of these supporting clips comprises in the present instance a single length of sheet metal, preferably strap iron, of an appropriate gage and width to afford the requisite stiffness. This strip of metal has its intermediate portion formed by means of dies or other suitable means into a central channel 6 which is adapted to straddle and rest upon the longitudinal rib 5 formed by that portion of the web of the bead adjacent to the aperture 4, and those portions of the strip at opposite sides of the central channel 6 are formed into a pair of oppositely arranged channels 7 which are spaced equidistantly at opposite sides of the central channel 6 and are so spaced apart as to receive between them and engage the lateral edges of the base flange 2 of the bead when the clip is in fastened relation thereto. Immediately beyond the lateral channel 7 of the strip, the material of the latter is offset or bent inwardly to form a pair of oppositely arranged ledges 8 and beyond these ledges, the opposite ends of the strip are extended in divergent planes to form a pair of fastening or attaching arms 9 and 10 which may be perforated as shown or otherwise so constructed as to enable them to receive nails or other appropriate devices for securing them to the lathing or any other suitable part of the wall adjacent to the corner to be protected.

In constructing the clip, the attaching arms 9 and 10 thereof are preferably arranged at an angle greater than the angle of the corner to which the clip is to be applied, and while the arms of the clip are in this angular relation, the oppositely arranged ledges 8 are slightly spread apart so that one end of the clip may be passed through the appropriate aperture 4 of the bead, and while one edge of the base flange of the latter rests in one of the lateral channels 7 of the clip, the opposite ledge may be sprung over the opposite edge of the base flange of the bead, thereby causing the opposite edges of the base flange of the bead to be arranged in the respective lateral channels of the clip. In applying the bead and the attached clip to the corner of the wall or other structure, the attaching arms of the clip are bent or otherwise brought together until they rest against the surfaces of the wall adjacent to the corner, and this approaching movement or lessening of the angle between the attaching arms of the clip causes the channeled portions 7 to move together and firmly bind the opposite longitudinal edges of the base flange of the bead, while the ledges 8 obtain a firm engagement with the back of the base flange, the binding or gripping action obtained by the channeled portions 7 of the clip preventing longitudinal slipping movement of the bead and also preventing tilting of the same about a longitudinal axis, while the engagement of the ledges 8 beneath the flange of the bead provides a firm abutment or support which will resist blows or other forces tending to force the bead inwardly. By applying nails or other suitable devices to the attaching arms of the clip, the clip may be firmly secured to the wall, and a positive and firm locking engagement is provided between the clip and the bead.

In practice, the use of a clip constructed in accordance with my present invention in connection with a corner bead or strip having a laterally projecting supporting flange has been found very satisfactory, the channeled portions of the clip embracing the longitudinal edges of the supporting flange on the bead, and the ledges engaging beneath or behind said flange to effectually prevent tilting or twisting of the bead or strip after the clip has been secured so that it is practically impossible for the bead to loosen by reason of blows or strains which are brought to bear thereon. The clip is so constructed that it may be quickly applied to the bead or corner strip with the greatest facility and by inexperienced persons, it being only necessary after the application of the clip to bend the attaching arms thereof together or toward one another until they conform to the angle of the corner to which these clips are to be applied, the approaching movement of the attaching arms serving to automatically grip and lock the bead or strip to the clip without the necessity of employing tools to effect this locking action, and as the clip is composed preferably of a single strip of metal which extends continuously from one end to the other without having any portion thereof cut or punched, the maximum strength of the clip is insured.

While it is preferable in most cases to employ the clip in connection with a bead or strip of the character shown, it will be understood, however, that this clip can be employed in connection with corner beads or strips of various forms, it being necessary only to provide a supporting flange or its equivalent by means of which the clip may obtain the requisite grip or engagement with the bead. I also contemplate employing a corner bead or strip of solid rolled T-form, or a form approaching approximately the form of an ordinary railroad rail, it being possible to employ a bead of this character either in connection with the clip shown or in connection with clips of different forms, and in each instance, a corner bead or strip of the solid form described will possess the maximum rigidity and beads of this form can be manufactured cheaply.

I claim as my invention:

1. The combination of a corner bead having a flange projecting laterally from opposite sides and also provided with an aperture located forwardly of said flange, and a clip comprising a strip the intermediate portion of which extends through the aperture in the bead and is formed with inwardly projecting ledges which engage the rear side of the flange at the base of the bead, the ends of the strip forming a pair of attaching arms which when moved toward one another produce a gripping action between said ledges and the bead.

2. A clip for corner beads or strips comprising a pair of attaching arms arranged initially at an angle greater than the angle of the corner to which the clip is to be applied so as to enable the clip to be readily attached to the bead, and having reversely arranged channels constituting opposed gripping portions formed at the inner sides of said arms and adapted to grip the bead when the attaching arms are moved toward one another to conform to the angle of the corner.

3. The combination of a corner bead having a transverse opening, and a clip therefor having attaching arms, and an intermediate portion passing transversely through said opening of the bead and having means coöperating with the lateral exterior edges of the bead to obtain a locking engagement therewith.

4. The combination of a corner bead having a transverse aperture, and a clip formed of a single strip of metal having attaching arms, and an intermediate portion extending through the aperture of the bead and having means for obtaining a locking engagement with the latter.

5. The combination of a corner bead or strip having a laterally projecting supporting flange, and a clip bendable at an intermediate point and provided with a pair of attaching arms, said arms being provided at their inner sides with opposed channels which obtain a grip upon the said laterally projecting flange when the said attaching arms are moved toward one another.

6. The combination of a corner bead or strip having a supporting flange projecting outwardly and laterally from its opposite sides, and a clip bendable at an intermediate point and provided with a pair of attaching arms, portions of said arms being provided at their inner sides with reversely arranged channels which have a locking engagement with said flange when the relative angle of the attaching arms is varied by a bending of the clip.

7. The combination of a corner bead or strip having a supporting flange projecting outwardly from opposite sides thereof, and a clip having attaching arms which arms are provided with oppositely arranged channeled portions which engage the supporting flange, said attaching arms constituting means for moving toward one another said channeled portions to engage said flange and to secure them in locking engagement therewith.

8. The combination of a corner bead or strip having an aperture, and a clip composed of a continuous strip of metal having a pair of attaching arms, and an intermediate portion extending through the aperture of the bead and provided with means which have a locking engagement with the bead or strip.

9. The combination of a corner bead or strip having a supporting flange and a web portion provided with a transverse aperture which provides a lateral rib at the forward side of said flange, and a clip having a central channeled portion straddling said rib, and a pair of oppositely arranged channeled portions engaging the respective edges of the supporting flanges of the bead, the ends of said clip forming attaching means.

10. The combination of a corner bead or strip having a laterally projecting supporting flange and also having an aperture forward of said flange, and a clip formed of a continuous strip of metal having an intermediate portion extending continuously across the forward side of said flange and through said aperture and provided with a ledge arranged at and engaging the rear side of said flange.

11. The combination of a corner bead or strip having a laterally projecting supporting flange and also having an aperture forward of said flange and a clip composed of a continuous strip of metal having a central portion extending continuously across the forward side of said flange through said aperture and having a pair of inwardly projecting ledges engaging the rear side of said flange.

12. The combination of a corner bead or strip having a supporting flange projecting laterally from its opposite sides and also having an aperture forward of said flange, and a clip composed of a continuous strip of metal and provided with a pair of attaching arms, and a pair of oppositely arranged channeled portions formed intermediately of said arms and engaging the opposite edges of the supporting flange on the bead, the strip between said channeled portions and the respective arms being offset inwardly to provide a pair of ledges which engage at the rear side of said flange, the middle of the strip extending through said aperture in the bead.

13. The combination of a corner bead or strip having a supporting flange projecting laterally from its opposite sides and having a forwardly projecting web portion having a transverse aperture, and a clip provided with a pair of attaching arms, and an intermediate portion passing transversely through said aperture and provided with a central channel engaging the web portion of the bead, a pair of oppositely channeled portions engaging the edges of the supporting flange, and a pair of inwardly projecting ledges or shoulders engaging at the rear side of said flange, said channeled portions and ledges being engaged with the bead by a relative approaching movement of the attaching arms of the clip.

14. A corner bead composed of a strip of solid rolled metal of T-form in cross section and provided with a plurality of longitudinally spaced apertures formed in the web portion thereof, in combination with a clip, a portion of which extends through one of said apertures in the bead and is provided with means for clamping the lateral edges of one of the flanges of the bead.

15. The combination of a corner bead composed of a solid strip of material of T-form in cross section and having a solid rigid base flange portions of which project laterally from opposite sides of the bead, the web of the bead forward of the base flange being provided with an aperture, and a supporting clip comprising a strip the intermediate portion of which extends through the aperture and lies against the forward side of the base flange of the bead, said strip being bent inwardly to form ledges which coöperate with the rear side of the base flange of the bead, the ends of the strip forming attaching arms which when moved toward one another cause said ledges to coöperate with and grip the bead.

16. The combination of a corner bead having a base flange and a forwardly extending web, the latter having an opening in front of said base flange, and a clip comprising a strip of metal the intermediate portion of which forms a strap which extends through the opening in the web of the bead and engages the forward side of the base flange thereof, and unbroken continuations of the intermediate portion forming a pair of attaching arms, the strip extending unbrokenly from one end across the forward side of the base flange of the web and to its opposite end, the clip also having means coöperative with the bead to lock the latter thereto.

In testimony whereof I have hereunto set my hand in presence of two subscribing witnesses.

JOSEPH M. SHEAR.

Witnesses:
FLORENCE SANDBLADE,
DAVID SHEAR.